United States Patent [19]

Burr

[11] Patent Number: 4,479,323

[45] Date of Patent: Oct. 30, 1984

[54] OSCILLATING TROLLING LURE

[76] Inventor: Roland E. Burr, 4825 Leaside St., Saginaw, Mich. 48603

[21] Appl. No.: 462,317

[22] Filed: Jan. 31, 1983

[51] Int. Cl.³ .............................................. A01K 85/04
[52] U.S. Cl. .................................... 43/42.5; 43/42.33; 43/42.51
[58] Field of Search ................... 43/42.33, 42.5, 42.51, 43/42.52

[56] References Cited

U.S. PATENT DOCUMENTS

| 2,547,240 | 4/1951 | Young | 43/42.5 |
| 2,608,787 | 9/1952 | Krogue | 43/42.51 |
| 2,657,495 | 11/1953 | Eppinger | 43/42.5 |
| 2,740,225 | 4/1956 | Dedrick | 43/42.5 |
| 2,765,570 | 10/1956 | Sedivy | 43/42.5 |
| 2,945,317 | 7/1960 | Wittman, Jr. | 43/42.5 |
| 3,378,946 | 4/1968 | Jay | 43/42.5 |
| 3,418,744 | 12/1968 | Panicci | 43/42.5 |
| 3,673,727 | 7/1972 | Bauer | 43/42.5 |
| 3,881,271 | 5/1975 | Jacura | 43/42.5 |
| 4,075,778 | 2/1978 | Howard | 43/42.5 |
| 4,122,624 | 10/1978 | Smith | 43/42.5 |
| 4,142,318 | 3/1979 | Morrell | 43/42.5 |
| 4,174,584 | 11/1979 | Howard | 43/42.5 |

FOREIGN PATENT DOCUMENTS

| 513444 | 6/1955 | Canada | 43/42.5 |
| 643449 | 6/1962 | Canada | 43/42.5 |

Primary Examiner—Nicholas P. Godici
Assistant Examiner—Kurt Rowan
Attorney, Agent, or Firm—Learman & McCulloch

[57] ABSTRACT

A trolling fishing lure for salmon, lake trout, and the like adapted to be towed at trolling speeds behind a power boat comprising: a plate-like frontal portion having means for attachment of a line, a plate-like trailing portion having means for attachment of a treble hook or the like, and a vertically sloping midportion interjacent the frontal and trailing portions. The trailing portion is substantially flat and lies substantially in a horizontal plane. The midportion extends crosswisely at an oblique angle to the longitudinal axis of the body, the wall having a side edge of greater extent at one end, and of lesser extent at the other. The frontal portion lies in a horizontally tipped plane, with the lowermost side edge of the frontal portion vertically upwardly spaced from the plane in which the said trailing portion substantially lies.

7 Claims, 4 Drawing Figures

OSCILLATING TROLLING LURE

BACKGROUND OF THE INVENTION

This invention relates to trolling lures for fish such as salmon, lake trout, and the like, which may be used with downriggers at depths in the neighborhood of, for example, 90 feet. More particularly, it is directed to a lure designed for rapid, and compound, oscillating movement about the attachment of the lure to the leader, the hook end of the lure swinging simultaneously vertically and horizontally in an arcuate path generally about the connection to the leader as a sort of fulcrum. The Joseph J. Wittmann, Jr., U.S. Pat. No. 2,945,317, issued July 19, 1960, discloses a lure which is stated to move side to side (faster to one side than the other) but is directed to a casting, as distinguished from a trolling, lure. A lure of the Wittmann configuration spins when drawn through the water at trolling speeds.

One of the prime objects of the present invention is to design a trolling lure which will oscillate arcuately with respect to a horizontal plane and will not spin when drawn at fishing depths through the water behind a power boat proceeding at the trolling speeds required for such fish as salmon and lake trout.

A further object of the invention is to provide a trolling lure which, when drawn through the water, achieves a compound vertical and horizontal motion about its front end as a general fulcrum, the trailing or hook end of the lure moving in an arc about the front end of the lure, and in a path which is vertically raised at its ends with respect to the midpoint of the path.

Still another object of the invention, is to fashion an economically produced and reliable lure of a lightweight, bendable material, such as aluminum, such that its rear end may be tipped upwardly, as desired, to permit the fisherman to enhance the fish-attracting action of the lure as it is pulled through the water at particular trolling speeds.

Other objects and advantages will become apparent with reference to the accompanying drawings

SUMMARY OF THE INVENTION

A trolling lure suitable for downrigger trolling is configured to provide a swinging movement in a vertically arcuate back and forth path as it is drawn through the water, the back end of the lure describing a greater arc of movement about the front end as a general vertical fulcrum. The lure is fashioned from a generally flat plate and comprises a front section, a trailing portion with a treble hook attached, and a midportion, interjacent the front portion and trailing portion, consisting of a vertically sloping wall extending crosswisely at an oblique angle to the longitudinal axis of the body. The wall terminates in side edges which are of different lengths so the frontal portion which is tipped vertically has a lower edge which lies vertically above the general plane of the trailing section.

The drawings particularly and distinctively illustrate the invention claimed.

IN THE DRAWINGS

Figure 3:
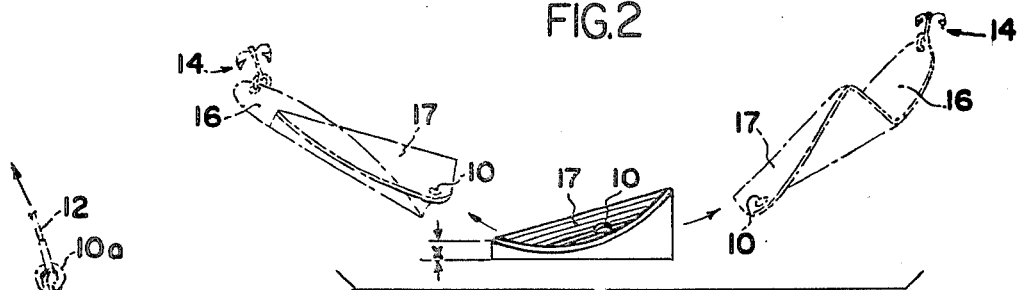
Figure 4:
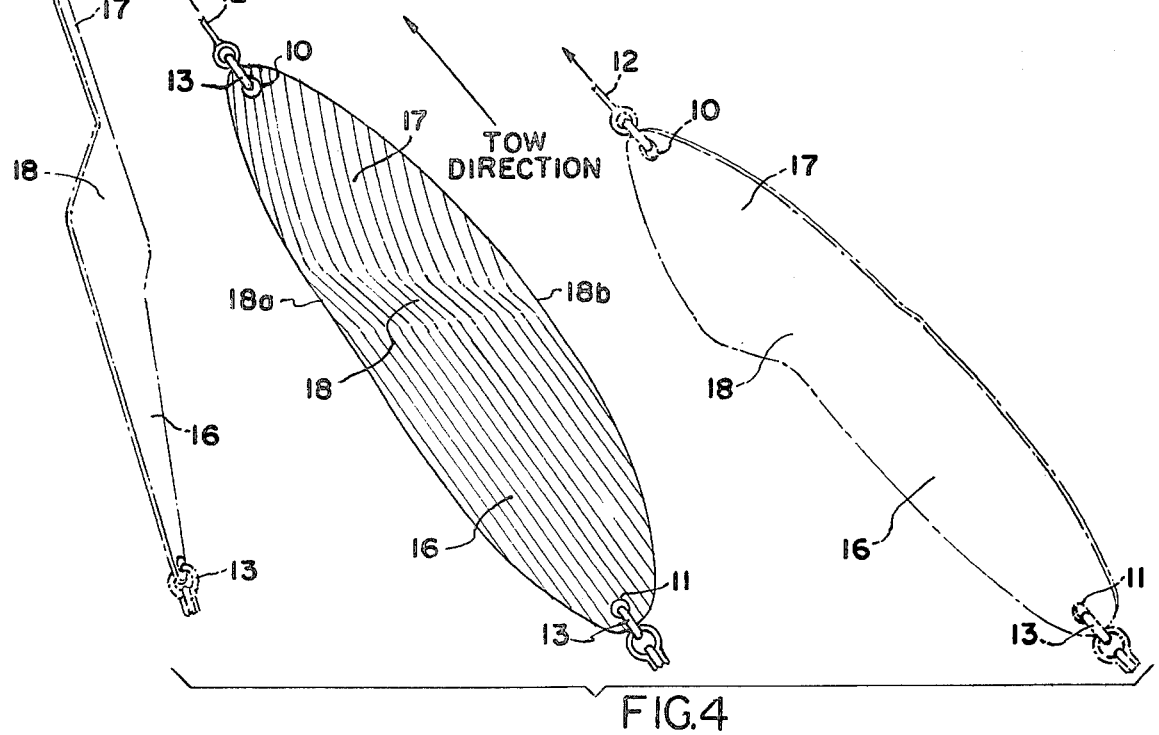

FIG. 3 is an end elevational view, with the extreme positions of the lure shown in chain lines and illustrating the path of movement of the lure as it is drawn behind the power boat from which it is being trolled at trolling speeds; and FIG. 4 is a similar top plan view, with the chain line representations also illustrating the extreme positions of the lure, as it is being moved in a particular tow direction.

Referring now more particularly to the accompanying drawings, it will be seen that the lure, generally designated L is fashioned from an elongate plate of generally elliptical shape in plan, having openings 10 and 11 provided in its frontal and trailing ends which define a centrally offset axis a for the body. A snap swivel 10a extends through the opening 10 to premit the attachment of a leader 12 leading to the line and trolling rod which is mounted on the power boat for moving the lure through the water at trolling speeds. Similarly, a split ring 13 extends through opening 11 and permits attachment of a treble hook system or the like 14.

Figure 2:
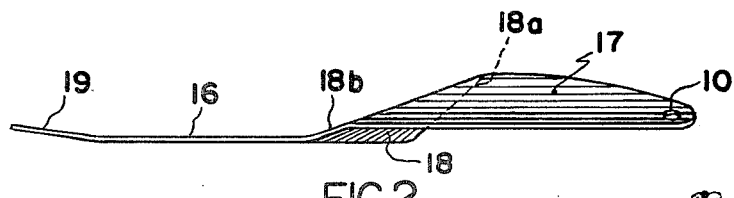
FIG. 2 is a side elevational view.

As will be evident from FIG. 2, the lure body is fashioned from a relatively thin plate of a lightweight material, such as aluminum, which can be easily bent and will remain in the configuration to which it is bent. Other possibilities are brass, steel, and plastic. If aluminum is used, the lure surfaces preferably are of a polished nature and have a light reflecting quality which may be enhanced by the addition of a contrasting band, such as at 15 applied to its lower surface. The band 15, which may be painted on, may be, for example, chartreuse in color. Alternatively, the band 15 may comprise adhesively backed strips of plastic which are secured in position and may incorporate rhinestone-like reflecting elements or the like 15a dispersed along their length.

Figure 1:
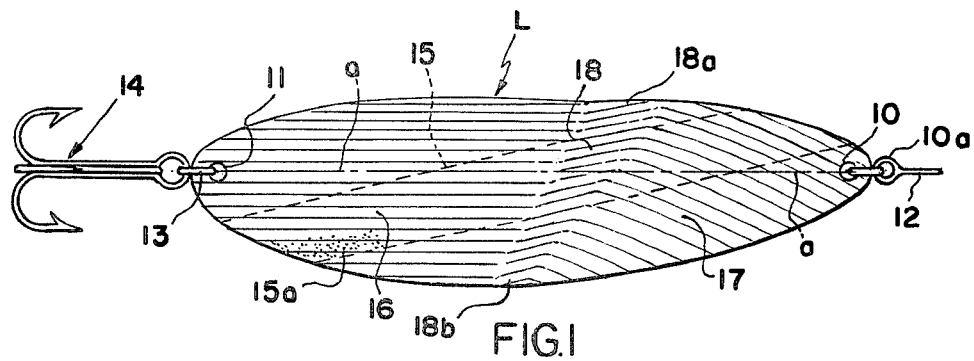
FIG. 1 is a top plan view of my novel and useful lure.

As can be seen in FIGS. 1 and 2, particularly, the plate-like lure body is configured to provide a trailing portion 16 which lies substantially in a horizontal plane, a frontal portion 17, and an interjacent wall 18 connecting the portions 16 and 17. The interjacent portion comprises a vertically sloping four sided wall which extends at an oblique angle to the offset longitudinal axis of the body crosswisely of the lure body. This wall 18 includes a bottom edge 18c, an upper edge 18d, a side edge of greater extent 18a, and a side edge of lesser extent 18b, with the side edge 18b of lesser extent being disposed on that edge of the lure body which is most remote from the offset axis a, this arrangement providing a raised distance x between the plane of the portion 16 and the lower edge of portion 17 to achieve a stabilizing effect which permits the wall 18 to control the arcuate path of movement of the lure as it is being drawn through the water, and to enhance its capacity to maintain its oscillating path of travel, and avoid spinning. Treble hook 14 provides a stabilizing weight which also assists and the trailing portion 16 further has a greater axial length than the frontal portion 17, which contributes. The extreme rear end of the trailing portion 16 is normally tipped upwardly as at 19 dependent upon the trolling speed being used.

FIGS. 3 and 4 particularly illustrate the fishattracting movement of the lure as it is pulled through the water. As these figures illustrate, the rear end of the lure oscillates in a dished or vertically arcuate path covering less than 180°, with respect to a horizontal plane, all generally about the front end eye 11 as a general fulcrum. The action is very attractive to larger predator fish, particularly such as salmon, lake trout and the like. Generally speaking, by trolling speeds, I refer to speeds in the neighborhood of 2 to 4 miles per hour which, of course, are far faster than the speeds achieved when a line is manually retrieved by fishermen using a spinning reel or the like.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. In a fishing lure for salmon, lake trout, and the like adapted to be towed at trolling speeds behind a power boat; the product comprising:
   a. a thin, lightweight, light reflecting, elongate, plate-like body fashioned of lightweight material and having a generally elliptical upper and lower surface which includes;
   a. a frontal portion having means for attachment of a line; a trailing rear portion having means attaching a treble hook system or the like; and a midportion interjacent the frontal portion and trailing portion;
   b. the means for attachment of a line and attaching the hook system defining a centrally offset longitudinal axis;
   c. the trailing portion being substantially flat and lying substantially in a horizontal plane;
   d. the interjacent portion comprising a vertically sloping four sided wall having an upper side extending crosswisely at an oblique angle to the offset longitudinal axis of the body, the wall having a downwardly and rearwardly inclined side edge of greater extent at one end, and downwardly and rearwardly inclined side edge of lesser extent at the other end;
   e. the frontal portion being a plate-like section lying in a horizontally tipped plane, with the lowermost side edge of the frontal portion being vertically upwardly spaced from the plane in which the said trailing portion substantially lies;
   f. The said centrally offset longitudinal axis separating the body into a portion of greater width and a portion of narrower width on opposite sides of said axis, and the side edge of the four sided wall of lesser extent comprising a side edge portion of the body portion which is of greater width;
   g. the shape defined being such that the trailing portion of the lure swings in an oscillating vertically concave arc with respect to a horizontal plane less than about 180°, generally about its means for attachment of a line, while being towed at trolling speeds.

2. The lure of claim 1 in which the one edge of the wall comprising said midportion lies at an angle of about 60° to 75° with respect to said axis and the other edge lies at an angle of about 35° to 55° with respect to said axis.

3. The lure of claim 1 in which the front end of the frontal portion is of less width than the rear end of the trailing portion, and the very rear end of the trailing section is tipped slightly upwardly.

4. The lure of claim 3 in which the body is formed of a bendable material such as aluminum to permit the angle of the tip to be adjusted.

5. In a fishing lure for salmon, lake trout, and the like adapted to be towed at trolling speeds behind a power boat; the product comprising:
   a. a thin, lightweight, light reflecting elongate body fashioned of lightweight material which includes:
   a. a frontal portion having means for attachment of a line; a trailing portion having means for attachment of a treble hook system or the like; and a midportion interjacent the frontal portion and trailing portion;
   b. the means for attachment of a line and for attachment of a hook system defining a longitudinal axis;
   c. the trailing portion lying substantially in a horizontal plane;
   d. the interjacent portion comprising a vertically sloping four sided wall having an upper edge extending crosswisely at an oblique angle to the longitudinal axis of the body, the wall having a vertically inclined side edge of greater extent at one end, and a vertically inclined side edge of lesser extent at the other;
   e. the frontal portion generally lying in a horizontally tipped plane, with the lowermost side edges of the frontal portion being vertically upwardly spaced from the plane in which the said trailing portion substantially lies.

6. In an oscillating fishing lure:
   a. a thin, lightweight, light reflecting elongate body device fashioned of lightweight material which includes:
   a. a frontal portion having means for attachment of a line; a trailing portion having an attached hook; and a midportion interjacent the frontal portion and trailing portion;
   b. the means for attachment of a line and attaching the hook defining a longitudinal axis;
   c. the trailing portion lying substantially in a horizontal plane;
   d. the interjacent portion comprising a vertically sloping four sided wall with an upper edge extending crosswisely at an oblique angle to the longitudinal axis of the body, the wall having a vertically inclined side edge of greater extent at one end, and a vertically inclined side edge of lesser extent at the other;
   e. the frontal portion having side edges which, at the juncture of the frontal portion and four sided wall forming the interjacent portion, are vertically upwardly spaced from the plane in which the said trailing portion substantially lies.

7. The lure of claim 6 wherein said longitudinal axis is centrally offset and separates the body on opposide sides of the axis into longitudinal portions of greater width and narrower width, and the vertically inclined side edges of the four sided wall are of different extent, the vertically inclined side edge of lesser extent comprising a side edge portion of the body portion which is of greater width.

* * * * *